Feb. 9, 1960 W. KAETHER ET AL 2,924,541
APPARATUS FOR EXTRACTING LIQUIDS FROM VEGETABLE MATERIALS
Filed Jan. 18, 1956 3 Sheets-Sheet 3

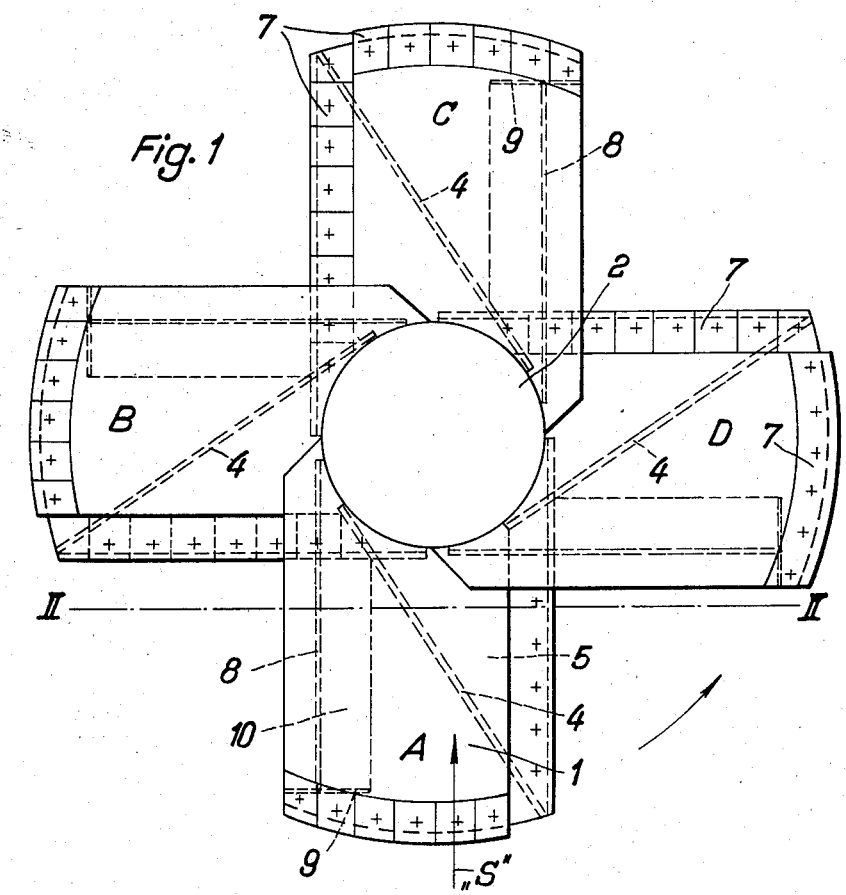
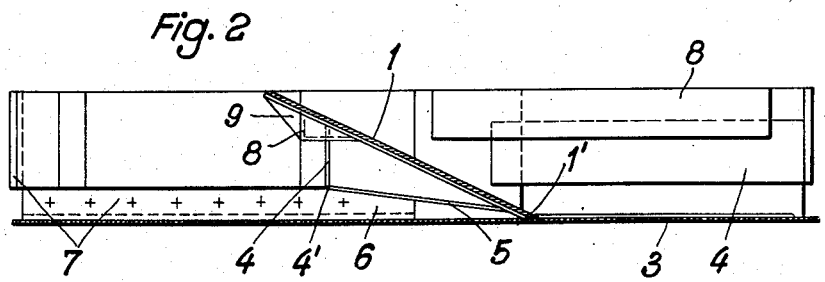

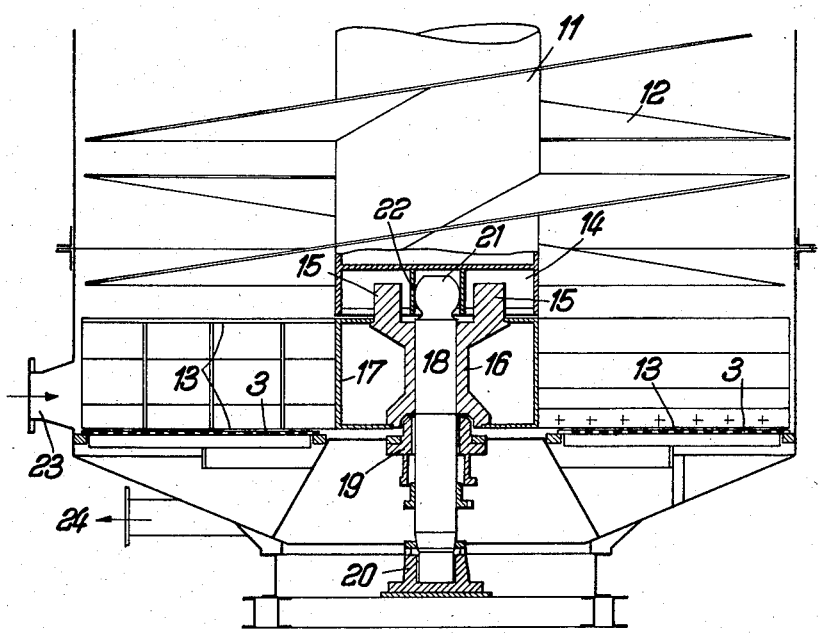

INVENTORS
WILLY KAETHER
& FRANZ MUSHACK
BY
Mestern & Rollin,
ATTORNEYS

United States Patent Office 2,924,541
Patented Feb. 9, 1960

2,924,541

APPARATUS FOR EXTRACTING LIQUIDS FROM VEGETABLE MATERIALS

Willy Kaether, Braunschweig-Melverode, and Franz Mushack, Wolfenbuttel, Germany, assignors to Braunschweigische Machinenbauanstalt, Braunschweig, Germany Application January 18, 1956, Serial No. 560,034

Claims priority, application Germany January 20, 1955

7 Claims. (Cl. 127—7)

For extracting vegetable materials, especially sugar beet slices, it is known to use diffusion towers. These consist of upright cylindrical vessels in which the material to be treated is conveyed by means of a worm or the like from bottom to top and the extraction liquid flows from top to bottom countercurrent to the material. The sugar beet slices to be extracted are pumped into the lower part of the tower above a screen which extends across the interior of the tower and through which the extraction liquid flows downwardly. For satisfactory operation of the tower it is important that the sugar beet slices pumped into the tower should be distributed uniformly over the surface of the screen and delivered to the conveyor worm which conveys them upwardly. This operation is performed by a distributor having a number of blades which are upwardly inclined. The lower edges of these blades sweep over the screen.

In the known diffusion towers the distributors have certain disadvantages which it is the object of the invention to obviate. These disadvantages are mainly that, when the sugar beet slices are pumped below the blades of the distributor, the slices form agglomeration which reduce the effectiveness of the screen surface which is swept by the distributor blades. Since the conveyor worm of the tower and the distributor each have separate drives, then if such agglomerations are formed or similar disturbances occur, the distributor and diffusion worm do not run at the same speed. This again is detrimental to a uniform upward conveyance of the slices from the lower part of the tower.

According to the invention, these disadvantages are obviated by means of a distributor, the blades of which are each provided on the underside with a guide plate which prevents the formation of agglomerations of slices and deflects the slices flowing from the periphery of the tower on to the next following blade of the distributor. The guide plates comprise vertically disposed triangular sheets, the points of which adjoin the front edges of the distributor blades. The sheets extend obliquely towards the hollow shaft of the distributor to which they are connected so as to be tangential thereto.

The under edge of the guide plate and the front edge of the inclined distributor blade above it are connected by a bottom blade. In this way there is formed at the lower part of the blade a hollow body which is resistant to bending and torsion. The bottom plate is then inclined to the guide plate in such a manner that it and the screen below it together enclose a wedge-shaped chamber which gradually increases in size towards the rear. Movable strippers of a known kind are provided at the front and side edges of the distributor blades.

In order to ensure that, if any irregularities should occur during the charging of the tower, the distributor and the main conveyor worm rotate in unison, the distributor shaft is coupled to the shaft of the main conveyor worm and driven from it. The connecting means may comprise a dog clutch the upper half of which is mounted in the tubular shaft of the main conveyor worm, whereas the lower half of the clutch is arranged on a hub body which acts as a carrier for the distributor.

The invention is illustrated by way of example in the accompanying drawing, in which:

Figure 1 is a plan view of the distributor in accordance with the invention;

Figure 2 is a sectional view taken on the line II—II of Figure 1; and

Figure 3 is an elevational view, partly in section, of the lower part of the diffusion tower showing in section the means connecting the tower and distributor shafts.

Figure 4:
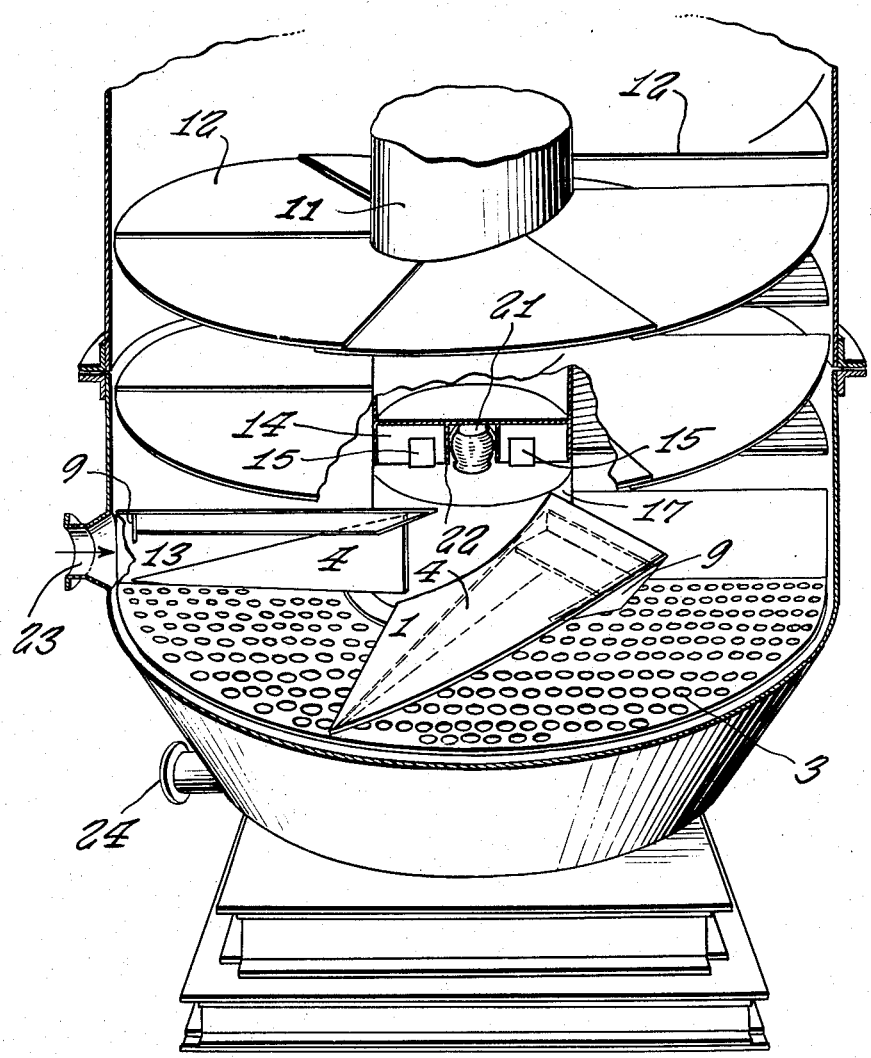

Referring to the drawing, the distributor comprises four distributor blades A, B, C, D which are formed by plates 1 which are inclined upwardly towards their inner ends. The plates 1 are connected to the distributor shaft which includes a cylindrical shell 2. The front edges 1' of the plates 1 sweep over the screen 3, which is situated below the distributor, and through which the juice flows away. The distributor blades are provided on the underside with guide plates 4. These guide plates are of triangular shape and arranged vertically in such a manner that their tips adjoin the outermost blade edges and they are inclined rearwardly, their elevated parts being tangential to the cylindrical shaft 2 of the distributor, preferably approximately at the height of the front edge of the following distributor plate 1.

The lower edge 4' of each guide plate 4 is inclined upwardly from its outer tip and the front edge 1' of the distributor plate 1 are connected by a bottom plate 5. In this way the plate 1, the guide plate 4 and the bottom plate 5 form a hollow body which is resistant to bending and torsion. The bottom plates 5 slope upwardly slightly so that a wedge-shaped chamber 6 remains between them and the screen surface 3, and the juice can pass through this chamber 6 to the surfaces of the screen 3 swept by the distributor blades. Strippers 7 are movably connected in a known manner to the front and side edges of the distributor blades A, B, C, D. The part of the plate 1 which does not form part of the hollow body is preferably made resistant to twisting by reinforcement plates 8, 9 and 10.

As will be seen from Figures 1 and 2, the stream of slices which is pumped in the direction of the arrow S from the periphery of the tower is deflected by the guide plate 4 in such a manner that it impinges on the inclined plate or blade 1 which next follows in the direction of rotation and is delivered into the vicinity of the lower blades of the conveyor worm of the tower. The slices do not collect together and do not form any agglomerate below the distributor blades.

In order now to obtain an absolutely satisfactory operation of the guide plates 4 and to ensure that the conveyor worm of the tower and the distributor rotate in unison, the distributor is coupled to the shaft of the main conveyor worm, and is driven therefrom, for example as illustrated in Figure 3.

As shown in this figure the shaft 11 of the conveyor worm provided with the blades 12 consists of a tube. The distributor 13 is releasably connected to this tube by means of a dog clutch. One half 14 of this clutch is disposed at the lower end of the shaft 11 of the conveyor worm, whereas the other half 15 of the clutch is mounted on a hub 16 which is surrounded by a cylindrical jacket 17.

In the hub 16 there is disposed an axle 18 and a bearing 19. The axle 18 is supported in a foot-step bearing 20. A guide head 21 at the other end of the axle 18 is surrounded by a sleeve 22 that is mounted on the upper half 14 of the clutch.

The drive of the main conveyor worm 11 and, therefore, of the distributor 13, takes place in a known manner from a driving mechanism disposed in the upper part of the diffusion tower.

In Figure 3 the inlet for the sugar beet sections is designated by the numeral 23 and the screen through which the juice passes is designated by the numeral 3, whereas the outlet through which the juice is withdrawn is designated by the numeral 24.

We claim:

1. In a diffusion tower for extracting juice from vegetable materials conveyed upwardly through the tower wherein they are treated with an extracting agent and the extracted juice is withdrawn in the lower part of the tower, a screen above said lower part of the tower, means for distributing the materials to be extracted comprising a rotatable shaft having a plurality of blades the leading edges of which are inclined upwardly from said screen, and a substantially upright guide plate on the undersurface of each blade connected to said blade and disposed tangentially of said shaft and forming with the leading edge of said blade an acute angle, said guide plate being offset from the center of said shaft, and means above the screen for supplying the materials to be extracted, said means being disposed to deliver the materials radially towards the center of said shaft, whereby the material supplied will be deflected by each guide plate towards the blade next following.

2. In a diffusion tower for extracting juice from vegetable materials which are supplied to the lower part of the tower and are conveyed upwardly in counter-current to an extraction liquid and the extracted juice is withdrawn in the lower part of the tower, a screen mounted above said lower part, a hollow rotatable shaft centrally mounted in said tower, a plurality of blades on said shaft the leading edges of which are inclined upwardly from said screen, means above said screen for supplying the materials to the lower part of said tower said means being disposed to feed said materials at various points in a direction radially towards the center of said shaft, and an upright guide plate on the undersurface of each blade being of triangular shape and connected tangentially to said hollow shaft with its tip adjoining the leading edge of said blade, forming in all positions of movement past a materials feeding means an angle with the radial direction of feeding, whereby the material supplied is deflected by each guide plate onto the blade which next follows in the direction of rotation.

3. A diffusion tower as claimed in claim 2, each of said guide plates being of triangular shape and being connected tangentially to said hollow shaft with its tip adjoining the leading edge of said blade, and the bottom edge of said guide plate being upwardly inclined from its outer tip.

4. In a diffusion tower as claimed in claim 2, a bottom plate connected to the lower edge of said guide plate and the outer edge of said blade so as to form with said guide plate and blade a hollow body.

5. In a diffusion tower as claimed in claim 2, the lower edge of each guide plate being inclined upwardly from its outer tip.

6. In a diffusion tower as claimed in claim 2, together with means for conveying said materials upwardly including a worm conveyor, and driving means, common to said worm conveyor and said distributor shaft for simultaneously driving the same.

7. A diffusion tower as claimed in claim 6, in which the means for driving the worm conveyor and for driving the distributor blades are releasably connected through a dog clutch.

References Cited in the file of this patent

UNITED STATES PATENTS 2,502,939    Frynta ---------------- Apr. 4, 1950

FOREIGN PATENTS 56,869    Austria ---------------- Dec. 12, 1912
516,705    Belgium ---------------- Jan. 31, 1953